UNITED STATES PATENT OFFICE.

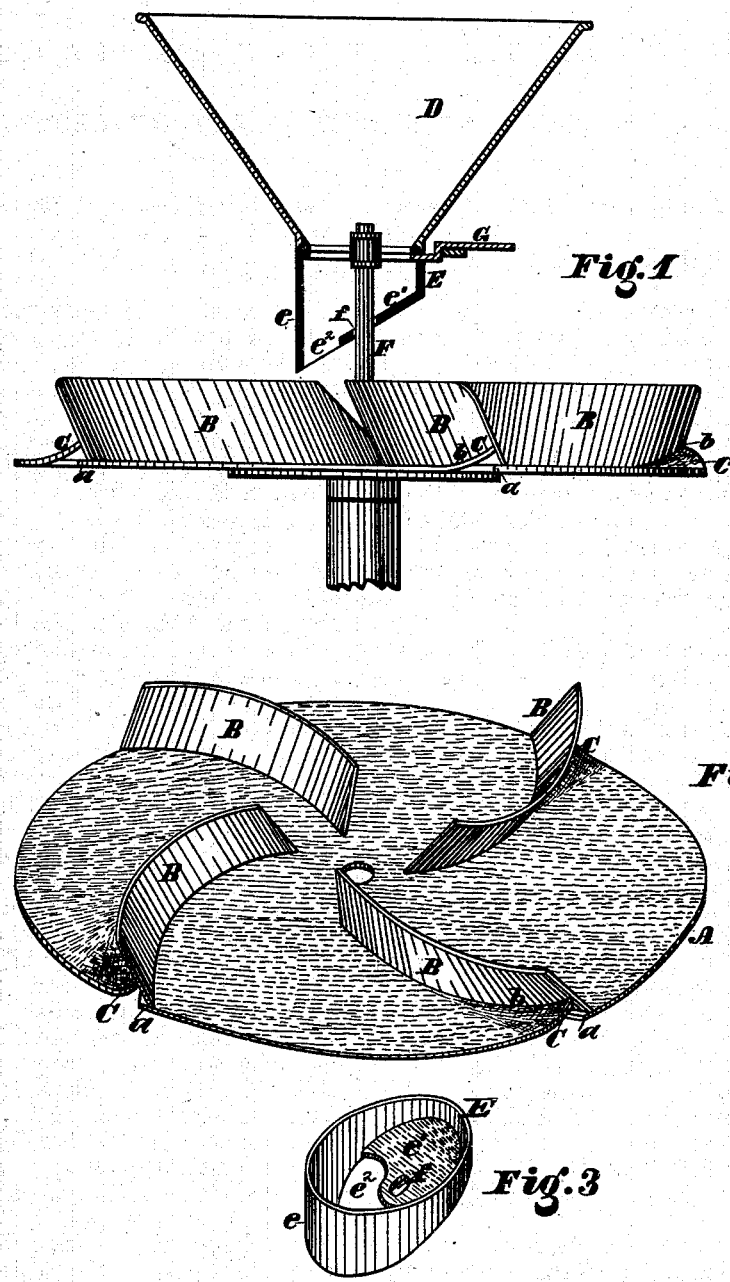

DAVID BUIST AND CHARLES E. ALDEN, OF PHILADELPHIA, PENNSYLVANIA.

IMPROVEMENT IN BROADCAST-SOWERS.

Specification forming part of Letters Patent No. 186,410, dated January 23, 1877; application filed June 21, 1876.

*To all whom it may concern:*

Be it known that we, DAVID BUIST and CHAS. E. ALDEN, of Philadelphia, in the county of Philadelphia and State of Pennsylvania, have invented certain new and useful Improvements in Broadcast-Sowers; and we do hereby declare the following to be a full, clear, and exact description of the invention, such as will enable others skilled in the art to which it pertains to make and use it, reference being had to the accompanying drawings, which form part of this specification, in which—

Figure 1 is a vertical section. Fig. 2 is a perspective of scatterer. Fig. 3 is a perspective of hopper-nozzle.

Our improvements, which have relation to the invention for which Letters Patent of the United States, dated April 6, 1875, were granted to us, have for their object to provide, first, an improved distributing-wheel, by means of which the grain, or other substance to be sown, may be thrown a greater distance than was heretofore obtainable by machines of this class; and, secondly, to provide for the hopper a nozzle or delivery end of peculiar construction, by means of which the grain, or other matter to be sown, will be delivered to the scatterer in such manner that it will be thrown only from the front half of said scatterer, thus dispensing with the rear guard or shield heretofore required, said nozzle being also adjustable, so that when, for any reason, it may be desired to sow on only one side of the track of the machine, such result may be accomplished.

Our improvements accordingly consist in the peculiar construction of the distributing-wheel and hopper-nozzle, and in the combination of said parts, as hereinafter more fully described.

Referring to the accompanying drawing, A designates the distributing-wheel, composed of a flat metallic disk, having curved radial ribs or partitions B B, which incline from the surface of the disk backwardly, so as to form an obtuse angle on their front side. The disk A is slotted or cut just back of each of the ribs B, as shown at $a$, and the metal of the disk struck up to form an incline or lift, C, the edge of which meets the back of the rib at $b$.

The effect of this construction is, that not only are the ribs B B stayed or braced, rendering them firmer and more secure than they would otherwise be, but the grain or other substance scattered by the wheel is given a lifting motion just before it leaves the disk, whereby it is carried much farther than it would be if said wheel were not formed with the lift, as described.

D represents the hopper formed with a removable or rotary neck, E, which serves as a nozzle or delivery end. Said nozzle is preferably of the form of a short cylinder, $e$, with beveled or inclined bottom $e^1$, the lowest edge of which is cut away, so as to leave a curved opening, $e^2$, between it and the wall of said cylinder. The shaft F, by which the wheel is rotated, passes through a centrally-located elongated slot, $f$, in the bottom $e^1$. The nozzle E being arranged on the hopper D so that the opening $e^2$ will be forward of a line drawn transversely through the center of the disk A, the grain or other material fed from the hopper will fall in front of said line, and will be thoroughly scattered without any portion of it falling back of said line.

By this means the shield or guard heretofore required in machines in which the material to be fed was delivered in the center of the wheel, and was therefore scattered equally in every direction, is dispensed with. A saving is, therefore, effected in the first cost of the machine, and the labor heretofore entailed by the necessity of picking up the grain thrown against the shield, and putting the same back in the hopper, is avoided.

By turning the nozzle E around so as to cause the slot $e^2$ to cross a line drawn transversely through the center of the disk, the machine may be made to sow on either the right or left side alone, or more to one side than another, the feed being duly graduated by means of the cut-off slide G.

The improvements herein described may be applied to hand as well as wheeled sowers, and the parts described may be made of metal or any other material.

The invention may be applied to sowing seed, and to distributing fertilizers, lime, &c.

What we claim as our invention is—

1. The distributing-wheel composed of the disk A, having the lift C and sloping curved ribs B, substantially as shown and described.

2. The delivery-nozzle composed of the cylinder $e$, having inclined bottom $e^1$ and slot $e^2$, substantially as shown and described.

3. In combination with a distributing-wheel or scatterer of a sowing-machine, a rotary hopper-nozzle, adjustable, so as to bring its feed-opening across a line drawn transversely through the middle of said wheel, and thus cause the latter to scatter wholly on one side of the track of the machine, or more on one side than on the other, substantially as shown and described.

In testimony that we claim the foregoing we have hereunto set our hands this 16th day of June, 1876.

DAVID BUIST.
CHAS. E. ALDEN.

Witnesses:
GEO. C. SHELMERDINE,
M. DANL. CONNOLLY.